United States Patent Office 3,436,235
Patented Apr. 1, 1969

3,436,235
COLLOIDAL SILICA COMPOSITIONS
CONTAINING SET INDICATOR
Charles E. Baer, Jr., Birmingham, William Evans, Warren,
and Eugene Malinowski, Detroit, Mich., assignors to
Eutectic Engineering Company, Detroit, Mich., a corporation of Michigan
No Drawing. Continuation-in-part of application Ser. No.
511,491, Dec. 3, 1965. This application Oct. 26, 1967,
Ser. No. 678,215
Int. Cl. B28b 7/34
U.S. Cl. 106—38.3                     2 Claims

ABSTRACT OF THE DISCLOSURE

Aqueous colloidal silica compositions containing a water-sensitive, organic, color-indicating dye such as β-resorcinolphthalein sodium, which changes color as the colloidal silica dries, are useful in preparing molds to be used for precision investment casting by the shell process and solid mold process. Use of the dye-containing silica compositions in preparing molds by an expendable pattern process for precision investment casting provide a quick and accurate method by which the hardening of the coatings can be determined visually.

CROSS-REFERENCE TO RELATED APPLICATIONS

This application is a continuation-in-part of our co-pending application Ser. No. 511,491 filed Dec. 3, 1965 now abandoned.

BACKGROUND OF THE INVENTION

This invention relates to aqueous colloidal silica compositions containing a water-sensitive organic color-indicating dye and to the use of these compositions in precision investment casting for coating expendable patterns.

In the manufacture of metal castings by the lost pattern method two techniques widely used are the ceramic shell process and the flask or solid mold process. In both of these processes it is customary to apply several coats of a refractory slurry to the pattern to be reproduced, allowing time between each coat for the previous coat to set-up or harden.

It has been difficult to determine quickly and easily when a coating has achieved sufficient set, green-strength, or hardness to enable it to receive the next coat. Often, to insure sufficient set of the applied coat, more than the necessary amount of time for setting is allowed.

We have discovered a quick, inexpensive and accurate method of determining when sufficient set-up has taken place in an applied slurry coat to permit application of a further coat. Moreover as the method of determining set is indicated by a color change in the applied coat only a visual examination is necessary.

Use in precision investment casting of aqueous colloidal silica compositions containing an organic color indicating dye of this invention, therefore, permits for rapid, low-cost evaluation of coating set and attendant efficiency in the overall casting process.

SUMMARY OF THE INVENTION

In summary we have discovered that aqueous colloidal silica compositions containing from 1 to 60 percent by weight of colloidal silica and from 0.01 to 4 percent, based on the weight of colloidal silica, of a water-sensitive organic color-indicating dye are particularly useful in precision investment casting. The colloidal silica compositions of this invention when used in either prime or back-up coats in an expendable pattern process allow rapid, accurate and inexpensive determination of that point in the drying process at which the applied coat has set-up sufficiently to be ready for application of another coat.

DESCRIPTION OF THE INVENTION

This invention relates to colloidal silica compositions and more particularly is directed to aqueous colloidal silica compositions containing from 1 to 60 percent by weight of colloidal silica and from 0.01 to 4 percent, based on the weight of colloidal silica of a water-sensitive, organic, color-indicating dye. This invention is further directed to the use of the aqueous colloidal silica compositions to prepare molds by an expendable pattern process for precision investment casting, whereby the degree of set, or green-strength of applied coatings can be visually determined.

The lost wax process most simply comprises the steps of (1) producing an expendable wax pattern having the shape, dimensions and size of an article to be produced; (2) coating the expendable pattern with a slurry comprising a binder component and a refractory powder; (3) further coating the pattern with granular refractory material; and (4) firing the coated pattern to melt the pattern out of the investment.

Another casting process in which the compositions of this invention can be used to advantage is the Shott molding process. This process is used most often when the casting requires only one precision cast surface such as dies, glass molds, and name plates. By this process a negative model is prepared in plaster from an object to be duplicated. The model is then coated with a cold rubber compound followed by a coating of plaster. When the plaster has set the rubber coated mold is removed from the model and coated with a refractory slurry in the manner of the wax pattern described above. After several refractory coatings the composite is fired at an elevated temperature to disintegrate the rubber and plaster mold.

In such processes it is important to ascertain when the refractory slurry coat is sufficiently dry and hard such that it is ready to receive the next refractory coating. It is uneconomical and time-consuming to wait until it is certain that the slurry coat is completely dry before applying the next refractory coat. However, to apply the next refractory coat before the applied coat is sufficiently set-up will result in a ruined investment. In addition it is important that the applied coating be of a uniform thickness.

By using the colloidal silica compositions of this invention in application of the refractory material in the lost wax process or Shott molding process it is easy to determine the uniformity of the applied coating and that point at which the applied coating has sufficiently set-up so that it can support the next coating or can be fired.

Colloidal silica suitable for use in the compositions of this invention includes all of those colloidal silica compositions traditionally used for precision investment casting. Representative of such compositions which are commercially available are Monsanto's "Syton"® aquasols, Nalco's "Nalcoag"® aquasols and Du Pont's "Ludox"® aquasols.

Similarly any organic dye, which when incorporated in the aqueous silica compositions will change color on drying, can be used in the colloidal silica compositions of this invention. Representative of suitable dyes are xanthene dyes such as phenolphthalien, Uranine B, Rhodamine 6 GDN Extra, Uranine SW Extra, and Rhodamine B Base; triarylmethane dyes such as crystal violet powder; thiazine dyes such as methylene blue; anthraquinone dyes such as Alizarine Red S and Anthraquinone Blue SWF; mono azo dyes such as Tartrazine Dis azo, dyes such as "Pontacyl" Blue Black SX sold by Du Pont; azine dyes such as Neutral Red; and aminoketone dyes such as Anthrasol Yellow HCG. Of the above dye classes those preferred for use in the compositions of this invention are the xanthene, triarylmethane and thiazine dyes with the xanthene dyes most preferred. Of the specific dyes which have been used in the compositions of this invention those most preferred are Rhodamine (tetraethyl rhodamine), Uranine (β-resorcinolphthalien sodium), Methylene Blue (3,7-bis[dimethylamino] phenozathionium chloride), and Crystal Violet (hexamethyl-p-rosaniline chloride).

The colloidal silica compositions of this invention comprise water, colloidal silica and the water-sensitive organic color-indicating dye. The colloidal silica is present in amounts ranging from 1 to 60 percent by weight based on the total weight of the composition. Preferred amounts of colloidal silica range from 2 to 50 percent by weight.

The amount of organic dye which is used in the compositions of this invention ranges from 0.01 to 4 percent based on the weight of colloidal silica present. The dye is preferably used in amounts ranging from 0.1 to 3 percent. Use of at least 0.1 percent insures adequate color presence in the green mold to make visual characterization of the set-strength possible and restricting the amount to 3 percent or less avoids any problems of precipitating the colloidal silica.

There will ordinarily be present in the colloidal silica compositions of this invention other components in quite large amounts. Thus, for example the slurry used in coating the expendable pattern traditionally contains as a major ingredient such refractory materials as silica flour, silica grain, zirconium silicate flour, zirconium silicate grain, molochite flour, molochite grain, as well as mullite, crystoballite, graphite, alumina and other particulate refractory materials.

The aqueous colloidal silica compositions of this invention are prepared by merely admixing the water-sensitive organic color-indicating dye with the aqueous colloidal silica aquasols and any other components compatible with this system and desirable for use in preparing the subject molds.

The expendable pattern to be coated is frequently attached with wax gates and risers to other patterns to form tress or clusters of patterns.

The trees are cleaned and dipped into an aqueous colloidal silica composition of this invention. This aqueous composition will ordinarily contain a large amount of very fine refractory flour so that a very smooth surface is formed adjacent to the expendable pattern. This first coat is called the prime coat.

After dipping the pattern into the slurry and draining the excess off of the tree the prime coat is usually coated while wet with a coat of dry refractory grain. This coat is known as a stucco coat and can be applied by sprinkling the grain on the wet prime coat or by dipping the tree in a fluidized bed of the refractory grain. The purpose of the stucco coat is to prevent cracking as the prime coat dries, and to better key the prime coat to the back-up coat next applied.

The prime coat must be sufficiently set prior to the application of the back-up coats. Air drying or evaporation is the usual method of setting the binder in the coatings. Drying must be carried out under carefully controlled atmospheric conditions to avoid cracking. Back-up material cannot be applied prior to the setting of the prime coat. Redipping or surrounding a prime coat which is not set sufficiently, with back-up material, will cause the coat to slough off, resulting in discarded molds or defective castings if the slough-off goes unnoticed.

By use of the dye-based formulations of this invention the prime coat changes color at a moisture level where the shell can be safely invested with additional material. The invention is particularly useful when patterns contain small cores or indentations where drying is the slowest and the determination of sufficient setting is most difficult.

Following the application and setting of the prime coat the ceramic shell process and the flask process differ. In the flask process a stainless steel can or flask open at either end is placed around the patterns and sealed to the base with wax. A back-up investment slurry material consisting of refractory grain combined with either (1) an acid phosphate magnesium with an acidified sodium silicate or colloidal silica aquasol, or (2) a hydrolyzed ethyl silicate type bonding agent is poured over the prime coated pattern. Prime coat grains may be used in the back-up slurry although the more usual practice is to use coarser and less expensive grains. The solid flask is usually vibrated to remove all included air and to compact the material to minimize dry down shrinkage and cracking. The flask is then set aside for the back-up investment material to harden.

In the ceramic shell process the back-up investment material is applied in substantially the same manner as the prime coat by immersion of the tree or cluster, which has a set prime coat, into the back-up slurry, draining, and stuccoing with dry grain while still wet. In some instances the prime coat slurry and stucco is used for the back-up coats although the usual practice is to use a less viscous back-up slurry containing either sodium silicate, hydrolized ethyl silicate or colloidal silica sol binder with coarser grain. The back-up stucco is usually coarser than the prime coat stucco. Thus, by using coarser back-up grain a thick shell can be built from a relatively small number of coatings.

Often the type of back-up refractory grains used differs from the prime coat grains. The back-up grains do not come in contact with the molten metal thus need not be as inert or as pure as the prime coat material. This grain must, however, have thermal expansion characteristics similar to the prime coat grain to avoid shell cracking during the heating-up and cooling-down cycles in the process.

After application each coat is allowed to set before additional coats are applied. Proper setting between back-up coats is critical. If sloughing-off occurs due to a shell being redipped before a previously applied coat has set sufficiently, the final shell will be considerably weakened. When such a shell is dewaxed it may crack from the pressure applied by the expanding wax. It may also crack when the molten metal is poured into it after firing. To prevent this, the usual practice is, as with the prime coat, to allow more time than is necessary under a given set of atmospheric conditions for proper setting. Since from 3 to 10 back-up coats are applied, this practice is time consuming and costly.

By use of the compositions of this invention in the back-up slurry this unnecessary delay in the process can be eliminated. Each coating of each shell will change color when it is sufficiently set to allow redipping. Thus guess work and uncertainty on the drying and redipping production lines are eliminated and even environmental control conditions are checked for proper operation by use of the compositions of this invention.

The final coating usually consists of a dip coat without stucco. This gives the shell a smooth outer surface which makes handling easier and reduces the risk of loose stucco falling into the mold after the pattern material is removed. Normally, a day is allowed after the final coat is applied for final drying before the pattern material is removed. This is to insure that all unattached solvent is removed and that the shell has maximum green strength.

After the flask or the shell has dried the disposable patterns, gates and sprues are removed to leave a mold cavity in which the metal to be molded may be cast. The usual method of removing the disposable material is flash dewaxing. The flasks or shells are inverted and heated to 1800°–2200° F. until a thin layer of wax or plastic is melted on the outer surfaces of the tree. This thin layer of liquid provides space wherein the remainder of the pattern material can expand as it heats up. The molds are then heated at a lower temperature (400–600° F.) until the bulk of the pattern material flows from the cavity. Care is taken at this dewaxing stage to prevent the tremendous expansion pressure of the pattern material from cracking the ceramic investments.

The molds are then fired above 1000° F. for from 15 minutes for small shells, to many hours for flasks, to increase strength. Molten metal is usually poured directly into the hot molds immediately after the firing step. On solidification of the metal the ceramic mold is removed by conventional techniques such as disintegration of the flask or shell by impact or vibration. Caustic leaching is sometimes used to remove ceramic material from recessed areas. The parts are then cut from the gating, polished and inspected.

The compositions and methods of this invention are further illustrated in the following examples wherein parts and percentages are by weight unless otherwise noted.

EXAMPLE 1

Prime coat slurry

| | Parts |
|---|---|
| Nalcast P1W fused silica flour (−200 mesh; 75% through 325 mesh) | 1066.0 |
| "Ludox"® HS colloidal silica aquasol (30% by weight SiO$_2$) | 453.6 |
| Ultrawet 60L (linear alkylate sulfonate organic salt) | 0.15 |
| Uranine SW Extra (β-resorcinolphthalein sodium) | 0.5 |

Back-up coat slurry

| | Parts |
|---|---|
| Nalcast P2 fused silica flour (−100 mesh; 45% through 325 mesh) | 739.4 |
| "Ludox"® HS colloidal silica aquasol (30% by weight SiO$_2$) | 453.6 |
| Uranine SW Extra | 0.5 |

Both of the above compositions are prepared in the form of a slurry by adding the silica flour and uranine dye to the aquasol while mixing the composition with a propellor mixer in a polyethylene tank. The slurries are mixed for 24 hours prior to use and the ultrawet is added to the prime coat slurry just prior to use. At the time of use the slurries are a brilliant green in color.

Pre-cast wax patterns clustered onto wax gating and sprues to form trees are cleaned by dipping the trees in acetone followed by a water rinse. The clean trees are then dipped into the prime coat slurry and are rotated there for 30 seconds. The trees are then removed from the slurry and are drained for 40 seconds after which they are immediately plunged into a fluidized bed of prime-coat stucco, −50 mesh Nalcast S1 fused silica grain, AFS classification 80, and are then hung in an environment control cabinet to set by air drying at 78° F. and 50% relative humidity.

The prime coat gradually changes color in the drying cabinet first on the exposed surfaces and then in recessed areas. After about 28 minutes the entire prime coat is a pale orange indicating sufficient set to apply the first back-up coat.

The prime coated trees are dipped in the back-up slurry in the same manner as in the prime slurry and are then plunged into a fluidized bed of the back-up stucco, −20 mesh Nalcast S2 fused silica grain AFS classification 20, in the same manner as described above. Each of the back-up coatings is dried under the same conditions as the prime coat. Forty to forty-five minutes are required for each back-up coating to change color from brilliant green to orange. Six back-up coats are applied. Each is applied immediately after the previous coating has changed completely from green to orange. The final coating is not stuccoed. No slough-off, which is often caused by premature redipping, is observed.

All the coatings are applied within 5 hours and then 24 hours is allowed for final drying. Dewaxing is accomplished by first plunging the coated trees into a 1800° F. oven for 30 seconds then into a 400° F. oven for 20 minutes. The resultant shells are then fired for 30 minutes at 1800° F. and molten metal at 2800° F. is then poured directly into them from a ladle. Cracking which is normally seen in shells where coatings are applied too quickly is not observed.

The metal is cooled and the ceramic shell removed with an air hammer and caustic leaching bath. All parts are inspected for surface defects which occur when shell coatings are applied before previous coats have set properly. No such defects are found.

EXAMPLE 2

The same formulations and procedures are used as in Example 1 except Rhodamine BW dye, tetraethyl rhodamine, is used in place of Uranine SW Extra at the same concentration level. Both the prime and back-up slurries are deep reddish purple.

As each applied coating sets its color changes from the reddish purple to light pink. Under ultraviolet light the fresh coatings appear dark violet and the set coatings glow a bright fluorescent orange. This glowing hue can readily be seen in deep, recessed areas of the pattern and tree when the ultraviolet source is directed at these areas. When the entire shell fluoresces orange under ultraviolet light the shell is redipped until the seven coatings are applied. The castings obtained, as in Example 1, are free of flaws caused by defects in the shell.

EXAMPLE 3

Prime coat slurry

| | Parts |
|---|---|
| Casting Supply House Zircon No. 3 flour (−325 mesh zirconium silicate) | 907.2 |
| "Ludox"® HS colloidal silica aquasol (30% by weight silica) | 272.2 |
| Ultrawet 60L wetting agent | 0.2 |
| Uranine SW Extra dye | 0.3 |

Back-up coat slurry

| | Parts |
|---|---|
| Casting Supply House molochite No. 6 flour (−200 mesh; 90% through 325 mesh) | 453.6 |
| "Ludox"® HS colloidal silica aquasol (30% by weight silica) | 362.9 |
| Uranine SW Extra dye | 0.4 |

The prime coat and back-up coat slurries are prepared as in Example 1. The zircon slurry is pale greenish-yellow in color and the molochite slurry is a brilliant green.

The patterns attached to the trees are dipped in the prime coat slurry as in Example 1, and are then dipped in a fluidized stucco bed of No. 1 grain Casting Supply House zircon, −80 mesh, and are set as in Example 1 until the greenish-yellow color has changed to orange. The back-up coatings are also applied in the same manner and number as in Example 1, with a stucco coating after every slurry coating except the last one. The stucco is No. 30/60 grain Casting Supply House molochite, −30 mesh. Each back-up coating when applied is a brilliant green and changes to a bright orange when the coating is set. Each successive slurry coating is applied as soon as the preceding coating is set. The patterns are removed from the shells and castings prepared by the same procedure of Example 1. The castings obtained, as in Example 1, are free from flaws caused by defects in the shell.

EXAMPLE 4

The same procedures are followed as in Example 1 and the same formulations are used as Example 3 except Rhodamine BW dye replaces the Uranine SW Extra dye at the same concentration level in both slurries.

The zircon slurry appears violet and the molochite slurry a light reddish purple. On setting-up a gradual change to a light pink is noted in the zircon slurry and stucco precoat under normal light. Under ultraviolet light, however, the fresh coat is dark violet with no fluorescence while the set coat fluoresces a brilliant orange. The initial back-up coat is applied when the entire prime coat fluoresces.

The molochite back-up coats, on setting-up, change from reddish purple to light pink. Under fluorescence this change is greatly amplified with fresh coatings appearing deep violet and non-fluorescent, while the coatings which have set appear a bright fluorescent orange. This fluorescence is readily viewed in deep recessed areas which take the longest to set. All back-up coatings are applied immediately after the outside of the shell turns fluorescent orange under ultraviolet light.

The shells are dried and the patterns removed as in Example 1. Metal castings are then prepared as in Example 1 with similar results.

EXAMPLE 5

The same prime coat slurry and stucco are used as in Example 1, however, two coatings are applied. When the prime coated trees set-up as indicated by the orange color, flat metal plates are glued to the bases of the trees and flasks are placed over the trees and sealed to these plates.

The back-up investment mix is prepared by mixing the following ingredients in a cement mixer for 3 to 5 minutes.

| | Parts |
|---|---|
| Silibond H-4, prehydrolyzed ethyl silicate | 228 |
| AP Green Grogo Mix 20, crushed finely divided Fireclay | 400 |
| Nalcast S1, fused silica grain | 600 |
| Magnesia | 4 |
| Red Iron Oxide | 0.2 |
| Water | 3 |

The water is mixed in last and the slurry is poured into the flask which sets on a vibrating table. The vibration is continued for 15 minutes. After 2 hours the bottom plate is removed and the flask, filled with the hardened slurry, is allowed to stand overnight.

Dewaxing, drying and the casting steps which follow are carried out as in Example 1. The results obtained are similar to those of Example 1.

We claim:
1. In a process for preparing molds for use in precision investment casting wherein an expandable pattern is coated with plural refractory layers by applying thereto an aqueous refractory slurry comprising colloidal silica as the binder, the improvement comprising adding to said slurry an organic water-sensitive dye from the group consisting of xanthene, triarylmethane, thiazine, anthraquinone, mono azo, azine, and aminoketone dyes in an amount sufficient to color said slurry, which dye undergoes a color change in said coating when said coating has set or dried, whereby said color change of said dye in said coating indicates when said coating is ready to receive the next layer of aqueous refractory slurry.

2. The process of claim 1 where said dye is added in amounts from .01 to 4 percent based upon the weight of colloidal silica.

References Cited

UNITED STATES PATENTS

| 2,627,089 | 2/1953 | Norwood | 106—84 XR |
| 2,739,075 | 3/1956 | Iler | 106—313 XR |
| 2,928,749 | 3/1960 | Watts | 106—38.3 |
| 2,937,146 | 5/1960 | Cutlip et al. | 252—408 XR |
| 3,165,799 | 1/1965 | Watts | 106—38.35 XR |
| 3,209,421 | 10/1965 | Shephard | 106—38.3 XR |
| 3,222,737 | 12/1965 | Reuter | 106—38.35 XR |
| 3,231,537 | 1/1966 | Fisher | 106—14 XR |
| 3,357,481 | 12/1967 | Snyder | 106—38.3 XR |

FOREIGN PATENTS 488,274  9/1936  Great Britain.

JULIUS FROME, *Primary Examiner.*

L. HAYES, *Assistant Examiner.*

U.S. Cl. X.R.

106—38.22, 38.27, 38.35